United States Patent [19]
Jernigan et al.

[11] Patent Number: 6,103,859
[45] Date of Patent: Aug. 15, 2000

[54] LATE ADDITION OF SUPPLEMENTAL ETHYLENE GLYCOL IN THE PREPARATION OF COPOLYESTERS

[75] Inventors: Mary Therese Jernigan; Carol Juilliard Greene; Larry Cates Windes, all of Kingsport, Tenn.

[73] Assignee: Eastman Chemical Company, Kingsport, Tenn.

[21] Appl. No.: 09/040,867

[22] Filed: Mar. 18, 1998

Related U.S. Application Data

[60] Provisional application No. 60/043,487, Apr. 9, 1997.

[51] Int. Cl.$^7$ .................................................. C08G 63/00
[52] U.S. Cl. ........................ 528/307; 528/272; 528/308; 528/308.6; 526/65; 526/66
[58] Field of Search ................................. 528/272, 307, 528/308, 308.6; 526/65, 66

[56] References Cited

U.S. PATENT DOCUMENTS

| | | | |
|---|---|---|---|
| 4,020,049 | 4/1977 | Rinehard | 528/274 |
| 4,077,945 | 3/1978 | Heinze et al. | |
| 4,230,818 | 10/1980 | Broughton, Jr. et al. | |
| 5,198,530 | 3/1993 | Kyber et al. | 528/279 |
| 5,340,907 | 8/1994 | Yau et al. | 528/274 |
| 5,385,773 | 1/1995 | Yau et al. | 428/221 |
| 5,681,918 | 10/1997 | Adams et al. | 528/279 |

FOREIGN PATENT DOCUMENTS

| | | |
|---|---|---|
| 0 431 977 A2 | 6/1991 | European Pat. Off. |
| 1 445 034 | 8/1976 | United Kingdom. |
| WO 95/00575 | 1/1995 | WIPO. |
| WO 96/28492 A1 | 9/1996 | WIPO. |
| WO 97/21754 A1 | 6/1997 | WIPO. |

OTHER PUBLICATIONS

"Improved Color Poly(ethylene/1,4–Cyclohexylenedimethylene Terephthalate", *Research Disclosure*, Mar., 1994, pp. 142–144, No. 359, XP000440539.

*Primary Examiner*—Samuel A. Acquah
*Attorney, Agent, or Firm*—Cheryl J. Tubach; Harry J. Gwinnell

[57] ABSTRACT

The invention is directed to a method for making copolyesters of terephthalic acid and a diol component including ethylene glycol and includes the steps of adding terephthalic acid and diol to a first esterification reactor and then late addition of supplemental ethylene glycol subsequent to the first esterification reactor but prior to a point where the ethylene glycol partial pressure is reduced below about 300 torr.

16 Claims, No Drawings

LATE ADDITION OF SUPPLEMENTAL ETHYLENE GLYCOL IN THE PREPARATION OF COPOLYESTERS

CROSS-REFERENCE TO RELATED APPLICATION

This Application claims the benefit of priority under 35 USC §119 of Provisional Application Ser. No. 60/043,487, filed Apr. 9, 1997, which is incorporated by reference herein.

FIELD OF THE INVENTION

This invention relates to a process for preparing copolyesters. More particularly, it relates to the preparation of copolyesters comprising terephthalic acid, ethylene glycol, and 1,4-cyclohexanedimethanol.

BACKGROUND OF THE INVENTION

Polyesters based on terephthalates, particularly copolyesters including ethylene glycol and 1,4-cyclohexanedimethanol (CHDM), are important commercial polymers used in the production of plastic articles such as packaging materials, molded articles, and films. The manufacturing process historically utilized in the synthesis of these copolyesters involves an initial ester exchange reaction wherein dimethyl terephthalate, ethylene glycol, and CHDM are reacted in the presence of a suitable catalyst with removal of by-product methanol. The product of this reaction is polycondensed under reduced pressure and high temperatures to produce the final product.

One difficulty encountered in the manufacture of these copolyesters is that the final product has a slightly yellowish tint. A neutral hue with glass-like appearance is highly desirable. For applications where these polymers are formed into thick sheet articles, the yellowish tint is particularly objectionable. In addition to a neutral hue, for certain applications a relatively high inherent viscosity (IV) is desired, e.g., for heavy gauge sheeting. It is also desirable economically to produce these copolyesters using terephthalic acid instead of dimethyl terephthalate.

Attempts to prepare such copolyesters with terephthalic acid following prior art teachings regarding conditions for the esterification reaction have, until recently, generally resulted in an esterification product having a diminished activity in the subsequent polycondensation step. The diminished activity is observed when comparing the polycondensation reaction starting with an ester exchange product prepared using dimethyl terephthalate as a reactant instead of an esterification product prepared using terephthalic acid. Diminished activity results in a lower viscosity.

For instance, U.S. Pat. No. 4,020,049 discloses a process for preparing linear polyesters from a dicarboxylic acid and glycols. Feed mole ratios of glycol to dicarboxylic acid of 1.05:1 to 1.7:1 are specified for the esterification reaction. Terephthalic acid and ethylene glycol are added continuously and simultaneously in stoichiometric proportions to produce a low polymer, which is removed to a polymerization vessel for polycondensation. In this reference, it is said that the resin produced has an intrinsic viscosity of at least 0.40, generally above 0.50. The highest reported intrinsic viscosity is 0.62.

U.S. Pat. No. 5,198,530 discloses a process for preparing polyesters by esterification of terephthalic acid with CHDM. This reference is only concerned with copolyesters having at least 80 mole percent 1,4-cyclohexanedimethylene terephthalate units. The process uses feed mole ratios of glycol to dicarboxylic acid of 1.0:1 to 1.5:1 in the esterification reaction, and requires a catalyst in the esterification reactor. At least three reactors connected in series may be used, each corresponding to, respectively, an esterification step, a precondensation step, and a polycondensation step. In addition to the feed of diol, additional CHDM is fed into the vapor space above the esterification product, in the reactor prior to the precondensation step.

U.S. Pat. Nos. 5,340,907 and 5,385,773 to Yau et al. are directed to a copolyester including cyclohexanedimethanol and process for production of the copolyester, using a catalyst and inhibitor system consisting essentially of Mn, Zn, Ti, Ge, and P. There are several examples using dimethyl terephthalate in batch-wise production of the copolyester; there are no examples using terephthalic acid itself. The reference further teaches that a continuous process can be operated by adding free dicarboxylic acid and glycol to molten low molecular weight linear or branched polyester resin and reacting them while continuously withdrawing low molecular weight resin and introducing the resin withdrawn into a polymerization apparatus.

Recently, a process showing improved polycondensation activity using terephthalic acid has been described in U.S. Pat. No. 5,681,918, to Hataway et al. The process comprises the steps of:

(1) reacting terephthalic acid, ethylene glycol, and 1,4-cyclohexanedimethanol in a feed mole ratio of total glycols to dicarboxylic acid of 1.7:1 to 6.0:1, at a temperature of 240° C. to 280° C., and a pressure of 15 psig to 80 psig for 100 to 300 minutes to form an esterification product;

(2) adding a polycondensation catalyst and 0.1 to 40 ppm of a toner to the esterification product of Step (1), wherein the polycondensation catalyst is selected from the group consisting of titanium, germanium, antimony, and combinations thereof; and (3) polycondensing the product of Step (2) at a temperature of 260° C. to 290° C. and a reduced pressure of 400 mm Hg to 0.1 mm Hg for a sufficient time to form a copolyester having an inherent viscosity of at least 0.50 dL/g, said process comprising adding 10 to 100 ppm of a phosphorus stabilizer in Step (2) or in Step (3). This process is an important advance, since the polycondensation activity of the esterification product is vastly improved over prior art methods using terephthalic acid.

However, under certain circumstances it may be desirable to have a low feed mole ratio of total diols to total dicarboxylic acids into the first esterification reactor. Such circumstances might include a desire for lower energy consumption or lower by-product formation. Therefore, in a process of making copolyesters involving an esterification step and a polycondensation step, there is still the problem of attaining a high viscosity resin providing thick sheets having a neutral hue, without using high feed mole ratios into the first esterification reactor.

SUMMARY OF THE INVENTION

The invention is directed to a process for preparing active copolyesters including an esterification step and a polycondensation step, having late addition of supplemental ethylene glycol. The esterification step occurs in one or more reactors and may optionally be followed by a precondensation or prepolymer stage prior to the polycondensation stage. The polycondensation step may occur in one or more reactors in series. The invention is characterized by having additional ethylene glycol added subsequent to the first esterification reactor, thus "late addition of supplemental ethylene glycol". The late addition of supplemental ethylene glycol allows for use of a lower mole ratio of diol to dicarboxylic acid into the first esterification reactor while still achieving satisfactory polycondensation activity and providing for a polyester characterized by having a neutral hue, high clarity, increased brightness, and a high inherent viscosity.

Thus, it is an object of the present invention to provide a process for the production of copolyesters comprising an dicarboxylic acid component and a diol component including ethylene glycol, wherein the product of the esterification reaction shows increased activity in the polycondensation reaction, without high mole ratios of diol to dicarboxylic acid added into the first esterification reactor, by late addition of supplemental ethylene glycol after substantial conversion of the carboxylic acid groups.

Another object of the invention is to provide a continuous, multi-reactor esterification process in the production of copolyesters comprising terephthalic acid and a diol component including ethylene glycol, wherein the dicarboxylic acid and diol are fed into the first esterification reactor and additional ethylene glycol is fed into a subsequent reactor or vessel, prior to a point where the partial pressure of ethylene glycol is too low to obtain any benefit by adding additional ethylene glycol.

A further object of the invention is to describe a process for preparing copolyesters of terephthalic acid and a diol component including ethylene glycol and cyclohexanedimethanol, comprising late addition of supplemental ethylene glycol.

Still another object of the invention is to describe a process for preparing copolyesters comprising terephthalic acid, ethylene glycol, and cyclohexanedimethanol, having an increased inherent viscosity via late addition of supplemental ethylene glycol, when compared to such a reaction without late addition of ethylene glycol.

These and other objects, features, and advantages will become apparent as reference is made to the following detailed description, preferred embodiments, and specific examples.

DETAILED DESCRIPTION OF THE INVENTION

The present invention is directed to a process for preparing copolyesters involving an esterification stage and a polycondensation stage. No catalyst is required for esterification. The entire process may be continuous or the process may involve a continuous esterification stage and then batch-wise polycondensation, or the process may be a batch-wise esterification followed by batch-wise polycondensation, or the process may be a batch-wise esterification followed by continuous polycondensation.

The esterification stage (or step) comprises adding at least one dicarboxylic acid and at least one diol into a first esterification reactor. As used herein, the word "adding", "addition", or the like, applies to both continuous and batch-wise processes, whereas the word "feeding", "fed", or the like, implies a continuous process. As used herein, the phrase "feed mole ratio" refers to the dicarboxylic acid and diol added initially to the first esterification reactor (R1). By "continuous process" is meant that the reactors are connected in series and material is moved constantly between reactors by gravity, pressure difference, or the like, and wherein there is continuous mass feed into the reactors and continuous mass withdrawal from the reactors at about the same rate. Of course it would be understood by the skilled artisan that the continuous reaction may be stopped momentarily at various points for various reasons.

In the case where the entire process is continuous or in the case where the esterification is continuous, it is preferred that the esterification step take place in at least two esterification reactors in series.

The dicarboxylic acid used is preferably terephthalic acid, although other dicarboxylic acids and mixtures of dicarboxylic acids may be used. When terephthalic acid is used, it may optionally be modified with another dicarboxylic acid, preferably no more than 10 mole percent (based on the total dicarboxylic acid content). Optional dicarboxylic acids include aromatic dicarboxylic acids, preferably having 8 to 14 carbon atoms, aliphatic dicarboxylic acids, preferably having 4 to 12 carbon atoms, and cycloaliphatic dicarboxylic acids, preferably having 8 to 12 carbon atoms. Combinations of dicarboxylic acids may also be used. Specific examples of dicarboxylic acids other than terephthalic acid include, but are not limited to, isophthalic acid, naphthalenedicarboxylic acid, cyclohexanedicarboxylic acid, stilbenedicarboxylic acid, succinic acid, glutaric acid, adipic acid, and azelacic acid.

The diol component includes ethylene glycol and preferably comprises ethylene glycol and CHDM, and more preferably comprises 10 to 90 mole percent ethylene glycol in the diol component. Still more preferably, the diol component comprises 18 to 90 mole percent ethylene glycol, and even more preferably 30 to 90 mole percent ethylene glycol. CHDM is preferably present in the amount of 10–70 mole %, based on total diol. In a more preferred embodiment having 10–90%, 18–90%, or 30–90% ethylene glycol, the remainder of the diol component is CHDM. The CHDM can be either the cis or trans isomer, or mixtures of the two isomers. Although it is preferred that the diol component consist of ethylene glycol and CHDM, other diols can be present. When present, other preferred diols include cycloaliphatic diols, more preferably having 6 to 20 carbon atoms, aliphatic diols, more preferably having 3 to 20 carbon atoms, and combinations thereof. Specific examples of other diols besides ethylene glycol and CHDM include, but are not limited to, diethylene glycol, 1,2-propanediol, neopentyl glycol, 1,4-butanediol, 1,5-pentanediol, and 1,6-hexanediol. In another preferred embodiment, the diol component containing ethylene glycol and CHDM may optionally be modified with up to 10 mole percent of an additional diol, based on 100 mole percent of the diol component.

The copolyesters of this invention may also contain small amounts of polyfunctional comonomers, e.g., trifunctional and/or tetrafunctional comonomers such as trimellitic anhydride, trimethylolpropane, and pentaerythritol. In an embodiment of the present invention, the copolyester may contain up to 5 mole percent of tri- or tetrafunctional comonomers, based on 100 mole percent dicarboxylic acid. The trifunctional and/or tetrafunctional comonomers are used particularly when branching is desired in the copolyester. Otherwise the copolyester produced is essentially linear, although minor amounts of branching may be present.

In the case of multiple esterification reactors connected in series, into the first esterification reactor are added at least one dicarboxylic acid, at least one diol, and the trifunctional and/or tetrafunctional comonomers, if any. It is preferred that the mole ratio of total diols to total dicarboxylic acid added to the first esterification reactor be at least 1.1:1. Although the upper limit of the mole ratio will vary depending on reactor design and operating conditions, generally the upper limit of the mole ratio of diol/dicarboxylic acid added to the first esterification reactor will be about 6.0:1. More preferably, the mole ratio of total diols to dicarboxylic acid added to the first esterification reactor will be about 1.2:1 to about 4.5:1. The dicarboxylic acid component and diol component can be added separately to the first esterification reactor, but preferably are added together as a slurry. In particular, in the case of a continuous reaction, the dicarboxylic acid and diol are most preferably fed together as a slurry.

In a preferred embodiment wherein CHDM is used, the amount of CHDM added into the first esterification reactor is approximately equal to the mole percent desired in the final copolyester product, and the excess diol in the reactant charge is ethylene glycol. In otherwords, if in the final copolyester, 62 mole percent of the diol component is to be CHDM, then 0.62 moles of CHDM is added per mole of dicarboxylic acid added.

In a preferred embodiment, continuous esterification is conducted in at least two reactors connected in series, R1 and R2. In the first esterification reactor (R1), esterification is preferably conducted at a temperature of about 240° C. to about 280° C. and preferably at a pressure of 15 psig to 80 psig. More preferably, the temperature is from about 240° C. to 260° C., even more preferably 250° C. to 260° C. The more preferable pressure is from about 20 psig to about 60 psig. Reaction times for the first esterification reactor are dependent upon the selected temperatures, pressures, mole ratios of diol to dicarboxylic acid added to the first esterification reactor, and on the desired percent conversion, but generally may vary from about 60 to about 300 minutes, more preferably about 100 to about 200 minutes.

In the first esterification reactor (R1), it is preferred that esterification proceed until at least 85% conversion is achieved, more preferably at least 90% conversion, where 100% would indicate that all carboxyl moieties had reacted to form ester moieties. One of ordinary skill in the art, in possession of the present disclosure, can determine when the desired conversion has occurred, by routine testing. The aforementioned conversion percentages can be calculated from measurements by titration for carboxylic acid moieties in combination with either NMR analysis or gel permeation chromatography. The details of these analytical methods are per se routine in the art.

In the first esterification reactor (R1), byproduct (i.e., water, when using terephthalic acid) is distilled off and the high boilers (e.g., ethylene glycol) can be recycled into the first reactor. If the ethylene glycol vapor condensate is not directly returned to the first reactor in a continuous esterification using more than one esterificaton reactor, a higher feed mole ratio to R1 should be used than in the case with direct return of ethylene glycol to R1, in order to achieve the same results. A similar consideration should be made in the case where batch reactors are used, as would be apparent to one of ordinary skill in the art in possession of the present disclosure.

In the preferred embodiment of continuous esterification using at least two reactors, the product of the first esterification reactor (R1) is then moved into a second esterification reactor (R2). Temperatures in the second reactor are similar to those in the first reactor, i.e., typically between about 240° C. and 280° C., more preferably about 250° C. to about 260° C. However, it is preferred that the pressure be about 10 psig less than in the first reactor. In this case, the pressure difference moves the product from R1 to R2. In an alternative, the product may be moved by gravity and then no pressure difference between R1 and R2 is needed. The exact reactor configuration, number of reactors, and reactor conditions (e.g., temperatures and pressures) can be determined by one of skill in the art in possession of the present disclosure without undue experimentation.

Typically, residence time in the second esterification reactor ranges from about 20 minutes, more preferably 30 minutes, to about 120 minutes, even more preferably about 50 to about 80 minutes. Generally the conditions and times are selected so that conversion continues until at least 92% conversion.

In the case where the entire process is continuous or in the case where the esterification is continuous and the polycondensation is batch-wise, it is preferred that the esterification step occur in at least two reactors and that the late supplemental addition of ethylene glycol occurs at some point after the first esterification reactor. It may occur in a pipe connecting R1 and R2 or more preferably into R2 itself. It may also occur into subsequent esterification reactors, when more than two esterification reactors are used, or, in a preferred embodiment, between the last esterification reactor and a point where the ethylene glycol partial pressure is much below 1 atmosphere (e.g., 300 torr or less). In a typical reactor, at some point the ethylene glycol partial pressure will be such that any added ethylene glycol will immediately boil away and the final product will not have a higher inherent viscosity. This point generally will be in a polycondensation reactor when the pressure is below about 300 torr. In a process according to the present invention, polycondensation preferably occurs at a point where the ethylene glycol partial pressures are below 1 atm. Thus, in a process according to the present invention, the supplemental addition of ethylene glycol preferably occurs at a point before the ethylene glycol partial pressure is reduced below about 300 torr. In a preferred embodiment, late addition of supplemental ethylene glycol occurs with addition of the polycondensation components, e.g., toner, catalyst, etc.

It will be appreciated by one of skill in the art in possession of the present disclosure that late supplemental addition of ethylene glycol may also be accomplished, in the case of batch-wise esterification, by addition to a single, batch-wise esterification reactor after a significant conversion of the terephthalic acid, e.g., at least 85% or more preferably at least 90% conversion has occurred.

In the case of late addition of supplemental ethylene glycol subsequent to the first esterification reactor, the amount of ethylene glycol to be added will depend on various factors, such as the residence time in all the esterification reactors, the conditions (temperature and pressure) in the esterification reactors, the feed mole ratio of total diols to total dicarboxylic acids into the first esterification reactor, and the desired activity in the subsequent polycondensation reaction.

When the late supplemental addition of ethylene glycol is made subsequent to R1 but prior to leaving the last esterification reactor (e.g., R2), the preferred amount of ethylene glycol added subsequent to R1 will be from about 0.1 to about 2 moles of ethylene glycol per mole of dicarboxylic acid added in the feed to the first esterification reactor (R1), more preferably about 0.3 to about 0.8 moles per mole of dicarboxylic acid added. The amount of ethylene glycol added can be optimized for a given set of esterification residence times, temperatures, and pressures, without undue experimentation.

The late addition of ethylene glycol can also occur between the esterification reactors and polycondensation reactor(s). Late addition of ethylene glycol can occur with addition of components such as toner(s), stabilizer(s) and/or catalyst(s) used in the polycondensation reaction. When added subsequent to the last esterification reactor, the preferred amount of ethylene glycol to add is about 0.1 to about 1 mole of ethylene glycol per mole of dicarboxylic acid added into R1. Again, for a given set of times, temperatures, and pressures, the amount of ethylene glycol to be added after the last esterification reactor (e.g., in a prepolymer reactor or more generally prior to a polycondensation reactor where the ethylene glycol partial pressure has been reduced below about 300 torr) can be determined in the same manner as for the addition to the esterification reactor(s), without undue experimentation. Late addition of supplemental ethylene glycol can also occur in multiple locations, e.g., into R2 and R3 (if present), or into R2 and with addition of catalyst and toner prior to the reduction of the ethylene glycol partial pressure below about 300 torr.

The aforementioned esterification process according to the present invention, involving late addition of supplemental ethylene glycol, provides for an oligomer which shows increased polycondensation activity when compared with the oligomer provided without late supplemental addition, and allows for the use of lower feed mole ratios (diol/dicarboxylic acid) into R1. Subsequent to esterification, the oligomer may be processed by any method to achieve the copolyester. Such methods are well-known in the art. Preferable methods include those disclosed in the aforementioned patents to Yau et al. and even more preferably methods disclosed in the aforementioned patent to Hataway et al. Generally, following esterification, a polycondensation catalyst or catalyst system and at least one toner and/or at least one stabilizer are added. The polycondensation catalyst may be any known polycondensation catalyst, but is preferably selected from titanium, germanium, antimony, zinc, or a combination thereof.

The use of one or more toners and/or stabilizers is preferred. Appropriate toners and stabilizers are per se known in the art, such as those described in the aforementioned Hataway et al. patent.

The copolyesters according to the present invention preferably have an inherent viscosity (IV) of 0.5 dL/g or greater, more preferably between about 0.6 and 0.9 dL/g, most preferably about 0.7 to about 0.9 dL/g., measured at 25° C. by dissolving 250 mg of copolyester in 50 ml of solvent consisting of a 60/40 weight ratio of phenol and tetrachloroethane.

SPECIFIC EXAMPLES

The following examples are meant to illustrate the present invention. Numerous modifications and variations are possible, and it is to be understood that within the scope of the appended claims, the invention may be practiced otherwise than as specifically described herein. Inherent viscosity as used below is determined as disclosed above.

Example 1

Supplemental Ethylene Glycol Added After Esterification

Esterification products were prepared using ethylene glycol, terephthalic acid, and distilled cyclohexanedimethanol, where the cyclohexanedimethanol content of the copolyester was 31 or 62-mole % of the total glycol. The esterification was continuous followed by batchwise polycondensation.

The esterification reaction was carried out in two continuous reactors connected in series (R1 and R2). A third vessel was used as a flash tank for collection of the esterification product. The feed mole ratio of total diols to terephthalic acid was varied from 2.0:1 to 1.5:1. The amount of CHDM in the feed was either 31 or 62 mole percent of the terephthalic acid in the feed slurry, respectively, depending on the desired CHDM content of the copolyester, with the excess diol in the feed slurry being ethylene glycol. Adjusting the feed flow rate of the slurry into R1 varied the esterification time. The fixed volume reactors had approximately a 2:1 volume ratio with 2230 mL in R1 and 1100 mL in R2. Substantially all the ethylene glycol vaporized from R1 was condensed and returned directly to R1.

The feed flow rate was varied from 14 to 23 mL/min such that the total esterification time varied from 150 to 225 minutes. The temperature in both esterification reactors was 255° C. The pressure in the first esterification reactor was 37 psig. The pressure in the second esterification reactor was 27 psig.

The esterification product was collected and 140 gram portions were polymerized in laboratory batch reactors. The reactors were equipped with an agitator, side arm, nitrogen inlet, and heat source. The catalyst was 45 ppm of titanium, and included 30 ppm of phosphorus as stabilizer (ppm based on the weight of the polymer). Before half of the polymerizations, 0.34 moles of ethylene glycol per mole of terephthalate groups (e.g., per mole of terephthalic acid added to R1—"TPA" in Table 1 below) were added to the oligomer, as indicated in Table 1. The ethylene glycol contained 104 ppm of blue toner and 50 ppm of red toner. After ten minutes at 225° C., the temperature was increased to 282° C. at 2°/min. The polycondensation reactions occurred under a reduced pressure of 0.5-mm Hg with a stirring speed of 50 rpm. Copolyesters with 31 mole % CHDM were polymerized at 282° C. for two different time periods: once for 40 minutes and once for 50 minutes. Copolyesters with 62 mole % CHDM were also polymerized at 282° C. for two different time periods: once for 25 minutes and once for 35 minutes. The test results are summarized in Table 1 on the following page.

The results in Table 1 are listed in order of decreasing benefit of late supplemental addition of ethylene glycol. Of course it will be recognized by one of skill in the art that the results shown in the table are relative, and that different absolute results will be obtained depending on reactor conditions (e.g., feed mole ratio into R1, temperatures, pressures, and residence times) and design (e.g., if ethylene glycol is condensed back into R1 but is instead recycled to initial feed into R1, or is not recycled at all). is important to note that inherent viscosity can be surprisingly increased by late addition of ethylene glycol.

The results listed in Table 1 indicate that, under certain circumstances, supplemental ethylene glycol added before polycondensation can result in significant increases in the polycondensation activity of esterification products. In general, the magnitude of the boost in polycondensation activity will be the greatest when using low feed mole ratios into R1 and short polycondensation times.

TABLE 1

| Mole % CHDM in polyester | Residence Time in esterification (minutes) | Feed Mole Ratio in slurry feed to R1 | Ethylene Glycol (moles/ mole TPA) | Polymerization Time (min.) | Inherent Viscosity (dL/g) |
|---|---|---|---|---|---|
| 62 | 225 | 1.5 | 0 | 25 | .408 |
| 62 | 225 | 1.5 | .34 | 25 | .696 |
| 31 | 150 | 1.5 | 0 | 40 | .520 |
| 31 | 150 | 1.5 | .34 | 40 | .688 |
| 31 | 150 | 1.75 | 0 | 40 | .578 |
| 31 | 150 | 1.75 | .34 | 40 | .717 |
| 31 | 150 | 1.75 | 0 | 40 | .571 |
| 31 | 150 | 1.75 | .34 | 40 | .703 |
| 31 | 225 | 1.5 | 0 | 50 | .635 |
| 31 | 225 | 1.5 | .34 | 50 | .763 |
| 31 | 150 | 1.75 | 0 | 40 | .674 |
| 31 | 150 | 1.75 | .34 | 40 | .74 |
| 62 | 225 | 2 | 0 | 35 | .764 |
| 62 | 225 | 2 | .34 | 35 | .751 |
| 62 | 150 | 2 | 0 | 35 | .795 |
| 62 | 150 | 2 | .34 | 35 | .738 |

Example 2

Supplemental Ethylene Glycol Added to the Second Esterification Reactor

Continuous esterifications followed by batch-wise polymerizations were carried out under the same conditions described in Example 1 with the exception that the supplemental ethylene glycol was added earlier, to the second esterification reactor (R2). The effect of adding supplemental ethylene glycol to R2 was studied for the lowest feed mole ratio (1.5:1) and shortest esterification time (150 minutes). A pipe was inserted into R2 such that the end of the pipe would be about an inch above the surface of the melt. A pump was used to introduce supplemental ethylene glycol through the pipe. Supplemental ethylene glycol was added at a rate that was expected to produce an R2 melt mole ratio equivalent to that which results from a feed mole ratio to the first esterification reactor (R1) of 2:1. The amount of ethylene glycol pumped into R2 corresponded to additional 0.6 moles of ethylene glycol per mole of terephthalic acid ("TPA" in Table 2) fed to R1. The results are shown in Table 2 below.

TABLE 2

| Mole % CHDM in polyester | Esterification Residence Time (minutes) | Feed Mole Ratio into R1 | Ethylene Glycol into R2 (moles/ mole TPA) | Polymerization Time (min.) | Inherent Viscosity (dL/g) |
|---|---|---|---|---|---|
| 62 | 150 | 1.5 | 0 | 25 | .379 |
| 62 | 150 | 1.5 | 0.6 | 25 | .727 |
| 62 | 150 | 1.5 | 0 | 35 | .512 |
| 62 | 150 | 1.5 | 0.6 | 35 | .753 |
| 31 | 150 | 1.5 | 0 | 40 | .52 |
| 31 | 150 | 1.5 | 0.6 | 40 | .74 |
| 31 | 150 | 1.5 | 0 | 50 | .622 |
| 31 | 150 | 1.5 | 0.6 | 50 | .748 |

The results in the above table clearly indicate that the final inherent viscosity is dramatically increased for the esterification products with a low feed mole ratio and a short esterification time. The increase in inherent viscosity is most pronounced with increasing mole percent of cyclohexanedimethanol and decreasing polycondensation time.

Accordingly, the present inventors have demonstrated that late addition of supplemental ethylene glycol provides for increased activity in the polycondensation reaction without the use of high feed mole ratios of diol to dicarboxylic acid when commencing the esterification process.

The invention has been described above in detail with particular reference to preferred embodiments thereof, but it will be understood that variations and modifications other than as specifically described herein can be effected within the spirit and scope of the invention. Moreover, all patents and literature references or other publications noted above are incorporated by reference for any disclosure pertinent to the practice of this invention.

We claim:

1. A process for the production of a copolyester comprising a dicarboxylic acid component and a diol component comprising ethylene glycol and 1,4-cyclohexanedimethanol, said process including an esterification step and a polycondensation step;

wherein the esterification step includes adding at least one dicarboxylic acid and a diol component comprising ethylene glycol and 1,4-cyclohexanedimethanol into a first esterification reactor;

and including a step of addition of supplemental ethylene glycol subsequent to the first esterification reactor.

2. The process according to claim 1, wherein the dicarboxylic acid component comprises terephthalic acid.

3. The process according to claim 1, wherein the addition of supplemental ethylene glycol occurs prior to the polycondensation step.

4. The process according to claim 2, wherein the esterification step is a continuous process comprising feeding terephthalic acid, ethylene glycol and 1,4-cyclohexanedimethanol into a first esterification reactor and feeding the product of the first esterification reactor into a second esterification reactor connected in series with the first esterification reactor.

5. The process according to claim 4, further comprising the addition of supplemental ethylene glycol into the second esterification reactor.

6. The process according to claim 1, wherein the process is continuous and further includes at least one polycondensation reactor under a glycol partial pressure of less than 300 torr and wherein the addition of supplemental ethylene glycol occurs before the ethylene glycol partial pressure is reduced below 300 torr.

7. The process according to claim 1, wherein the dicarboxylic acid component comprises terephthalic acid and the diol component comprises 10 to 90 mole percent ethylene glycol and 90 to 10 mole percent 1,4-cyclohexanedimethanol based on 100 mole percent of the diol component.

8. The process according to claim 7, wherein the diol component comprises 10 to 70 mole percent 1,4-cyclohexanedimethanol, based on 100 mole percent of diol component.

9. The process of claim 1, further comprising a step of feeding a slurry of the dicarboxylic acid component comprising terephthalic acid and the diol component to the first esterification reactor, and wherein the step of esterification in the first reactor is followed by esterification in a second reactor and then polycondensation in at least a third reactor, and wherein the step of addition of supplemental ethylene glycol the amount of supplemental ethylene glycol is 0.1 to 2.0 moles of ethylene glycol per mole of terephthalic acid.

10. The process according to claim 9, wherein the feed to the first esterification reactor contains at least 1.1:1 moles of the diol component per mole of terephthalic acid.

11. The process according to claim 10, wherein the feed to the first esterification reactor contains 1.1.1 to 6:1 moles of the diol component per mole of terephthalic acid.

12. A process of making a copolyester containing terephthalic acid, ethylene glycol, and 1,4-cyclohexanedimethanol, including an esterification stage and a polycondensation stage, comprising:

- a first step of adding a diol component containing ethylene glycol and 1,4-cyclohexanedimethanol and a dicarboxylic acid component containing terephthalic acid to a first esterification reactor and partially esterifying the dicarboxylic acid component with the diol component to make a first esterification product;
- a second step of feeding the first esterification product to a second esterification reactor and continuing esterification in the second esterification reactor to make a second esterification product;
- followed by a polycondensation stage including a first polycondensation reactor and including a step of polycondensation under a glycol partial pressure of less than 1 atmosphere;
- said process further including at least one step of adding supplemental ethylene glycol between said first step and a point where the ethylene glycol partial pressure is below about 300 torr.

13. The process according to claim 12, wherein the diol component and the dicarboxylic acid component are fed together in a slurry into the first esterification reactor in the ratio of 1.1:1 to 6.0:1 of diol to dicarboxylic acid.

14. The process according to claim 13, wherein supplemental ethylene glycol is added into the second esterification reactor in the amount of 0.1 to 2.0 moles of ethylene glycol per mole of dicarboxylic acid added to the first esterification reactor.

15. The process according to claim 13, wherein supplemental ethylene glycol is added after the last esterification reactor in the amount of 0.1 to 1.0 moles of ethylene glycol per mole of dicarboxylic acid added to the first esterification reactor.

16. A process of making a copolyester containing terephthalic acid, ethylene glycol, and 1,4-cyclohexanedimethanol, including an esterification step and a polycondensation step, comprising adding terephthalic acid, ethylene glycol, and 1,4-cyclohexanedimethanol into an esterification reactor and esterifying said terephthalic acid with said ethylene glycol and said 1,4-cyclohexanedimethanol, and further comprising adding supplemental ethylene glycol after at least 85 mole percent of the carboxylic acid moieties of said terephthalic acid are esterified.

* * * * *